July 6, 1937.  C. H. BOCK  2,086,376

LUBRICATING DEVICE

Filed Aug. 27, 1935

INVENTOR
CLARENCE H. BOCK.
BY
ATTORNEY

Patented July 6, 1937

2,086,376

UNITED STATES PATENT OFFICE 2,086,376

LUBRICATING DEVICE

Clarence H. Bock, Detroit, Mich., assignor to The Lubrication Corporation, Chicago, Ill., a corporation of Delaware Application August 27, 1935, Serial No. 38,068

3 Claims. (Cl. 285—170)

This invention relates to lubricating devices and more particularly to lubricant dispensing nozzles of the clamp type.

A number of different types of nozzles have been proposed to service lubricant receiving fittings, some of which have been plain nozzles forming a seal with a fitting merely upon being thrust against a fitting and others of which have included clamping means to hold the nozzle discharge orifice firmly in sealing engagement with a fitting. While plain type nozzles are simple and cheap to construct, they have not been satisfactory for use with extremely high pressures due to the difficulty of maintaining a lubricant tight seal against the back pressure of the lubricant on the nozzle. This difficulty is overcome in nozzles of the clamp type but as heretofore constructed these have been quite complicated and expensive to manufacture.

Accordingly one of the objects of the invention is to provide a novel lubricant discharge nozzle which is extremly simple and cheap to manufacture and which includes means to hold it in engagement with a fitting.

Another object of the invention is to provide a clamp type lubricant discharge nozzle in which clamping is effected by movement of the nozzle relative to a fitting.

According to one desirable arrangement a rigid conduit is provided having a discharge orifice, the walls of which are shaped for sealing engagement with a lubricant receiving fitting, the nozzle being arranged for swinging movement relative to the fitting while the walls of its discharge orifice are in engagement therewith. A yoke is pivoted to the nozzle with its central portion movable across the end of the nozzle toward and away from the discharge orifice thereof. The yoke is engageable with the fitting neck and upon swinging movement of the nozzle serves to pull the nozzle tightly against the fitting head, a large mechanical advantage being obtained so that a small force exerted on the nozzle to swing it results in a large force being applied between the nozzle and the fitting to maintain them in sealing contact.

Other objects, advantages and novel features will be apparent from the following detailed description when taken in connection with the accompanying drawing, in which.

Figure 1:
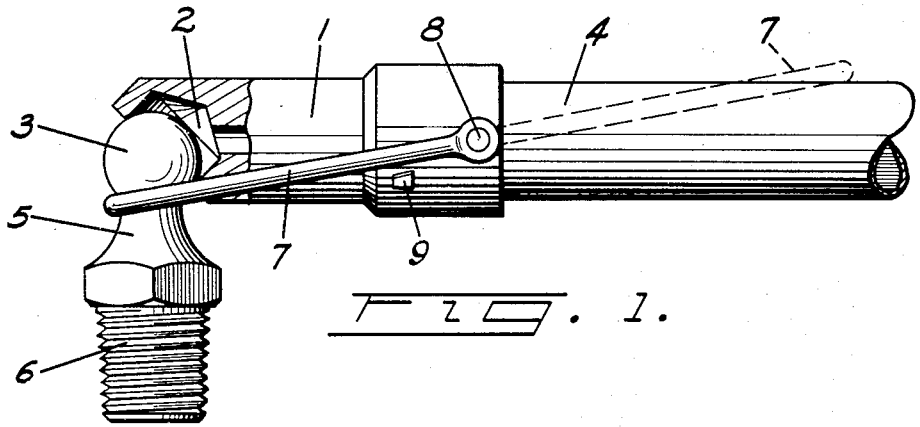
Fig. 1 is an elevation with parts in section of a nozzle embodying the invention applied to a fitting.

The nozzle illustrated is constituted by a rigid conduit member 1 having a passage therethrough which terminates in a discharge orifice 2, the walls of which are shaped to form a lubricant tight seal with a head 3 of a lubricant receiving fitting. The member 1 is connected to and receives lubricant from a suitable conduit 4 which may form the discharge conduit of a portable grease gun or which may be a flexible conduit leading from a stationary source of supply of lubricant under pressure. The fitting illustrated includes, in addition to the head 3, a reduced neck portion 5 and a shank 6 which is adapted to be connected to a bearing or the like to be lubricated so that lubricant forced into the fitting from the nozzle will pass through its head, neck and shank to the parts which it is desired to lubricate.

The parts so far described constitute a plain type nozzle which may be thrust against the fitting to make a lubricant tight seal between the fitting head and the walls of the orifice 2. However, as pointed out above, it is difficult to maintain this seal against the back pressure of lubricant on the orifice 2 in the event that extremely high pressures are employed to force lubricant into a "frozen" bearing or the like. Therefore, in order to hold the nozzle securely on the fitting, a U-shaped yoke 7 is pivoted at its ends on the member 1 as at 8 with its center portion swingable across the end of the member 1.

Figure 2:
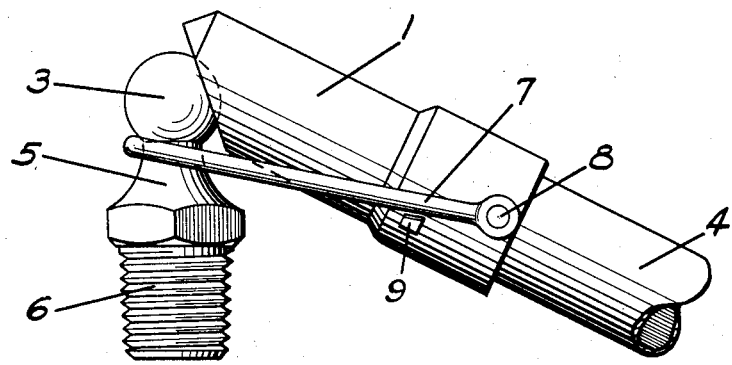
Fig. 2 is a view similar to Fig. 1 showing the nozzle in a different position.
Figure 3:
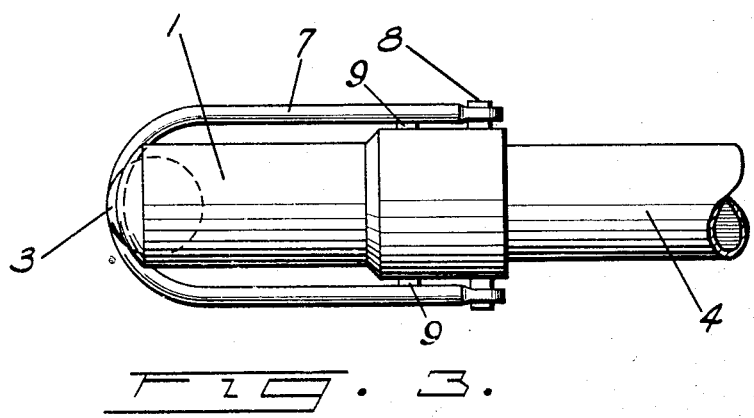
Fig. 3 is a plan view of the nozzle of Figs. 1 and 2.

In use, the nozzle is placed at substantially the angle indicated in Fig. 2 and the center part of the yoke 7 is slipped over the head of the fitting to engage with the neck 5 thereof. The walls of the orifice 2 may then be engaged with the fitting head and the nozzle swung into the position of Fig. 1 to draw the nozzle firmly against the fitting. It will be noted that the linkage constituted by the nozzle and the yoke 7 provides a large mechanical advantage so that a relatively small force applied to the nozzle to swing it will produce a high thrust between the nozzle and fitting, thereby holding the nozzle tightly against the fitting and maintaining a lubricant tight seal even against extremely high back pressures.

To remove the nozzle from the fitting, the nozzle may be swung into the position of Fig. 2 and raised off of the fitting, the yoke then being slipped over the head of the fitting. If it is desired to use the nozzle as a plain push type without the clamping feature, the yoke 7 may be swung into the dotted line position of Fig. 1 resting against the conduit 4 where it is out of the way and will not interfere with use of the nozzle. This enables faster operation where no excessive pressures are used.

Since the yoke 7 may swing, under the influence of gravity, about its pivots to positions where it may not be engaged with fittings in a quick and easy manner, it may be found necessary or desirable to put a stop such as illustrated at 9 on the side of the nozzle. The stop 9 will engage the yoke and will prevent the latter from swinging to an undesirable position.

The invention may also be applied to nozzles adapted to service other types of fitting. As an example a fitting such as that illustrated and described in my copending application Serial No. 657,575 filed February 20, 1933 may be serviced with the nozzle also shown therein when the nozzle is equipped with a clamping device of the character disclosed herein.

While only one embodiment of the invention has been shown and described it will be apparent that many changes might be made therein and it is not intended to be limited to the form shown or otherwise than by the terms of the appended claims.

I claim:

1. A lubricant discharge nozzle comprising a rigid conduit formed at one end with a fitting engaging surface, and a U-shaped yoke having its ends pivoted on the conduit and its central portion swingable across said conduit end and engageable with a fitting and operated by swinging movement of the nozzle relative to the fitting to hold the conduit in engagement with the fitting.

2. A lubricant nozzle for servicing a lubricant receiving fitting comprising, a rigid nozzle member having a discharge orifice the walls of which are formed to provide a lubricant tight seal with a fitting and swingable relative to the fitting, and a yoke pivoted on the nozzle and engageable with the fitting and operated by swinging movement of the nozzle relative to the fitting to hold the nozzle in engagement with the fitting.

3. A lubricant discharge nozzle comprising a rigid conduit having a discharge orifice at one end, the walls of which are shaped to engage a fitting, a yoke having its ends pivoted on said conduit and its center swingable across said orifice to engage the fitting for holding the conduit in engagement with the fitting, said yoke being movable into inoperative position with its center engaging the conduit at a point remote from said conduit discharge orifice whereby the conduit may be employed as a plain type nozzle without interference by said yoke.

CLARENCE H. BOCK.